US006424791B1

United States Patent
Saib

(10) Patent No.: US 6,424,791 B1
(45) Date of Patent: Jul. 23, 2002

(54) SYSTEM AND METHOD FOR PROVIDING SELECTION OF TIMER RECORDING

(75) Inventor: Joseph Saib, Inglewood, CO (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/049,455

(22) Filed: Mar. 27, 1998

(51) Int. Cl.$^7$ ...................... H04N 5/761; H04N 5/7613
(52) U.S. Cl. ........................................... 386/83; 386/46
(58) Field of Search ............................ 386/83, 92, 109, 386/111, 112, 46, 1; 725/86, 87, 88, 89, 101, 102; 360/32; H04N 5/761, 5/7613

(56) References Cited

U.S. PATENT DOCUMENTS

| | | |
|---|---|---|
| 4,751,578 A | 6/1988 | Reiter et al. |
| 4,855,833 A | 8/1989 | Kageyama et al. |
| 4,977,455 A * | 12/1990 | Young .......................... 386/83 |
| 5,001,697 A | 3/1991 | Torres |
| 5,040,067 A | 8/1991 | Yamazaki |
| 5,179,641 A | 1/1993 | Comins et al. |
| 5,223,924 A | 6/1993 | Strubbe |
| 5,253,066 A | 10/1993 | Vogel |
| 5,283,561 A | 2/1994 | Lumelsky et al. |
| 5,315,392 A | 5/1994 | Ishikawa et al. |
| 5,317,403 A | 5/1994 | Keenan |
| 5,323,234 A | 6/1994 | Kawasaki |
| 5,353,121 A | 10/1994 | Young et al. |
| 5,398,074 A | 3/1995 | Duffield |
| 5,416,508 A | 5/1995 | Sakuma et al. |
| 5,436,676 A | 7/1995 | Pint et al. |
| 5,465,113 A | 11/1995 | Gilboy |
| 5,485,197 A | 1/1996 | Hoarty |
| 5,502,504 A | 3/1996 | Marshall et al. |
| 5,512,955 A | 4/1996 | Toyoshima et al. |
| 5,513,342 A | 4/1996 | Leong et al. |
| 5,523,796 A | 6/1996 | Marshall et al. |
| 5,524,195 A | 6/1996 | Clanton, III et al. |
| 5,528,304 A | 6/1996 | Cherrick et al. |
| 5,532,753 A | 7/1996 | Buchner et al. |
| 5,532,754 A | 7/1996 | Young et al. |
| 5,541,738 A * | 7/1996 | Mankovitz ................... 386/83 |
| 5,544,288 A | 8/1996 | Morgan et al. |
| 5,559,548 A | 9/1996 | Davis et al. |
| 5,559,550 A | 9/1996 | Mankovitz |
| 5,585,838 A | 12/1996 | Lawler et al. |
| 5,585,866 A | 12/1996 | Miller et al. |
| 5,589,892 A | 12/1996 | Knee et al. |
| 5,594,509 A | 1/1997 | Florin et al. |
| 5,596,373 A | 1/1997 | White et al. |
| 5,598,520 A | 1/1997 | Harel et al. |
| 5,619,249 A | 4/1997 | Billock et al. |
| 5,621,456 A | 4/1997 | Florin et al. |
| 5,625,406 A | 4/1997 | Newberry et al. |
| 5,650,826 A | 7/1997 | Eitz |
| 5,671,411 A | 9/1997 | Watts et al. |

(List continued on next page.)

FOREIGN PATENT DOCUMENTS

EP          0267020          11/1988

OTHER PUBLICATIONS

International Search Report, PCT/US98/21991, Feb. 25, 1999, 3 pgs.

Primary Examiner—Robert Chevalier
(74) Attorney, Agent, or Firm—Blakely, Sokoloff, Taylor & Zafman LLP

(57) ABSTRACT

The present invention relates to a home entertainment system and method for selectively recording or purchasing a show broadcast for receipt by the home entertainment system. To perform selective recording or purchasing an electronic guide screen is initially produced. Upon viewing the electronic guide screen, a viewer may select a show to be entered into timer memory based on a search term. This selection prompts recording of the show or shows associated with the search term. Thereafter, the programming data associated with the show is loaded into timer memory.

20 Claims, 7 Drawing Sheets

U.S. PATENT DOCUMENTS

| | | |
|---|---|---|
| 5,703,795 A | 12/1997 | Mankovitz |
| 5,710,601 A | 1/1998 | Marshall |
| 5,719,637 A | 2/1998 | Ohkura |
| 5,731,844 A | 3/1998 | Rauch et al. |
| 5,737,029 A | 4/1998 | Ohkura |
| 5,745,909 A | 4/1998 | Perlman et al. |
| 5,754,651 A | 5/1998 | Blatter et al. |
| 5,760,772 A | 6/1998 | Austin |
| 5,781,246 A | 7/1998 | Alten et al. |
| 5,796,407 A | 8/1998 | Rebiai et al. |
| 5,798,760 A | 8/1998 | Vayda et al. |
| 5,801,747 A | 9/1998 | Bedard |
| 5,809,204 A | 9/1998 | Young et al. |
| 5,825,368 A | 10/1998 | Wilks |
| 5,828,420 A | 10/1998 | Marshall et al. |
| 5,844,620 A | 12/1998 | Coleman et al. |
| 5,850,218 A | 12/1998 | LaJoie et al. |
| 5,880,768 A | 3/1999 | Lemmons et al. |
| 5,892,521 A | 4/1999 | Blossom et al. |
| 5,909,212 A | 6/1999 | Nishina et al. |
| 5,929,932 A | 7/1999 | Otsuki et al. |
| 5,940,073 A | 8/1999 | Klosterman et al. |
| 5,945,987 A | 8/1999 | Dunn |
| 5,973,682 A | 10/1999 | Saib et al. |
| 5,995,155 A * | 11/1999 | Schindler et al. ............ 348/461 |
| 6,005,561 A | 12/1999 | Hawkins et al. |
| 6,005,601 A | 12/1999 | Ohkura et al. |
| 6,016,144 A | 1/2000 | Blonstein et al. |
| 6,023,267 A | 2/2000 | Chapuis et al. |
| 6,025,837 A | 2/2000 | Matthew, III et al. |
| 6,111,614 A | 8/2000 | Mugura et al. |

* cited by examiner

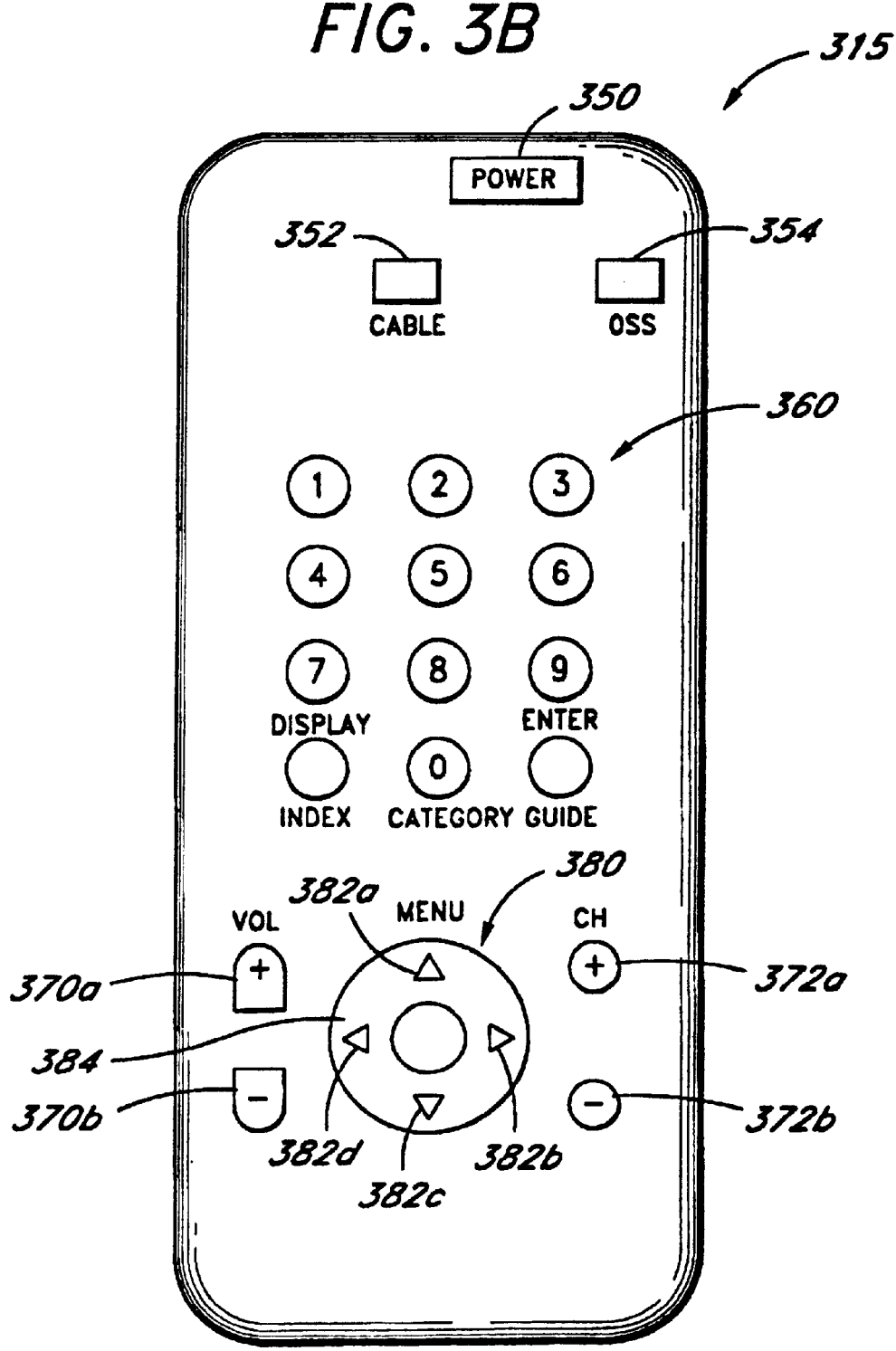

SYSTEM AND METHOD FOR PROVIDING SELECTION OF TIMER RECORDING

BACKGROUND OF THE INVENTION

1. Field of the Invention

The present invention relates to a system and method for providing selective, automatic recording of a show provided on a digital satellite system.

2. Description of Art Related to the Invention

Over the last few years, there has been a growing demand for entertainment systems working in conjunction with various types of broadcasting systems. One type of entertainment system includes a broadcast satellite system; namely, a digital satellite system (DSS). Normally, a DSS comprises an antenna, an integrated receiver decoder (IRD) and a television receiver (TV). Also, the DSS may include an analog video cassette recorder (VCR) to receive analog data for recording purposes. The operations of the IRD are controlled by a remote control.

The antenna receives and routes digital bit streams to the IRD. Typically, a digital bit stream includes sensory data (e.g., video and/or audio) and programming data for one or more shows. The programming data is periodically updated and stored within the IRD and the prior programming data is erased (e.g., deleted, overwritten, etc.). If a show is scheduled to be recorded, its programming data is stored within timer memory of the IRD. Usually, timer memory is non-volatile memory containing programming data for all shows scheduled to be recorded (generally referred to as "record data"). The IRD periodically accesses the record data to determine whether it should tune to a channel and process portions of an incoming digital bit stream into analog signals recognized by the analog VCR. Upon receiving a first command from the remote control, the IRD generates an "electronic guide screen" displaying programming data for each show capable of being received by the DSS.

There are currently two techniques for setting the DSS timer for recording a desired program. One technique involves manually setting the time, date and duration of the program to be recorded. This technique involves substantial user interaction, and is susceptible to human error. The reason for frequent recording errors is that substantial user interaction is needed to prevent a show, having its programming data already loaded into the timer memory, from being recorded. Normally, one of the following events would need to occur to prevent a show from being recorded: (i) deactivation the analog VCR, (ii) erasure of programming data of a show not scheduled to be recorded from timer memory, or (iii) removal of the video cassette tape from the analog VCR.

The second technique involves the selection of the program to be recorded from an electronic guide screen displayed by the IRD. Upon selection of the desired program, the DSS software loads the program's time, date and duration into its own timer. In order to load the data for timed recordings into the IRD, the user has to exit the electronic guide screen (FIG. 1) and depress one or more buttons on the remote control until a set timer screen is displayed on the TV receiver. As shown in FIG. 2, the set timer screen 200 requires the entry of certain data in order to automatically prepare the IRD to tune to a show for recording by an analog VCR. Such information includes the recording interval (one-time record, daily, or weekly) 210 corresponding to the day in which the desired show is broadcast, the start time of the show 220, end-time of the show 230, and its broadcast channel number 240. However, the user may not have knowledge of the program's schedule, or the channels over which the program may be broadcast. Thus, to utilize this feature of the DSS would again involve substantial user interaction, resulting in increased chances of recording errors.

By developing a system and method that allows selection of a show to be recorded without substantial user interaction, the frequency of recording errors may be reduced. To further mitigate user interaction, selection of the show may be performed when viewing the electronic guide screen.

SUMMARY OF THE INVENTION

The present invention relates to a home entertainment system and method for selectively recording or purchasing a show broadcast for receipt by the home entertainment system. To perform selective recording or purchasing an electronic guide screen is initially produced. Upon viewing the electronic guide screen, a viewer may select a show to be entered into timer memory based on a search term. This selection prompts recording of the show or shows associated with the search term. Thereafter, the programming data associated with the show is loaded into timer memory.

BRIEF DESCRIPTION OF THE DRAWINGS

The features and advantages of the present invention will become apparent from the following detailed description in combination with the figures listed below.

FIG. 3B is an illustrative embodiment of the remote controller 315 of FIG. 3A.

DESCRIPTION OF THE PREFERRED EMBODIMENT

In its preferred embodiment, the present invention relates to a system and method for selectively recording a show without requiring erasure from timer memory programming data associated with those shows not scheduled to be recorded. The present invention further relates to a method for loading or erasing programming data when viewing the electronic guide screen.

Herein, various terms are used to describe certain elements or characteristics of the present invention. For example, a "communication line" is broadly defined as any communication path between a source and a destination. The communication line may include one or more information-carrying lines (electrical wire, fiber optics, cable, etc.) or wireless communications through established techniques such as infrared (IR) and radio frequency (RF) signaling. A "signal" is construed as information transmitted in a parallel or serial manner. Stored within the system, "timer data" includes programming data of shows scheduled to be recorded and programming data of shows chosen by the user to be entered into timer memory but are not scheduled to be recorded. Timer data may further include programming data of shows that have been purchased for viewing. While certain illustrative embodiments are described in order to convey the spirit and scope of the present invention, such embodiments should not be construed as a limitation on the scope of the present invention.

Figure 1:
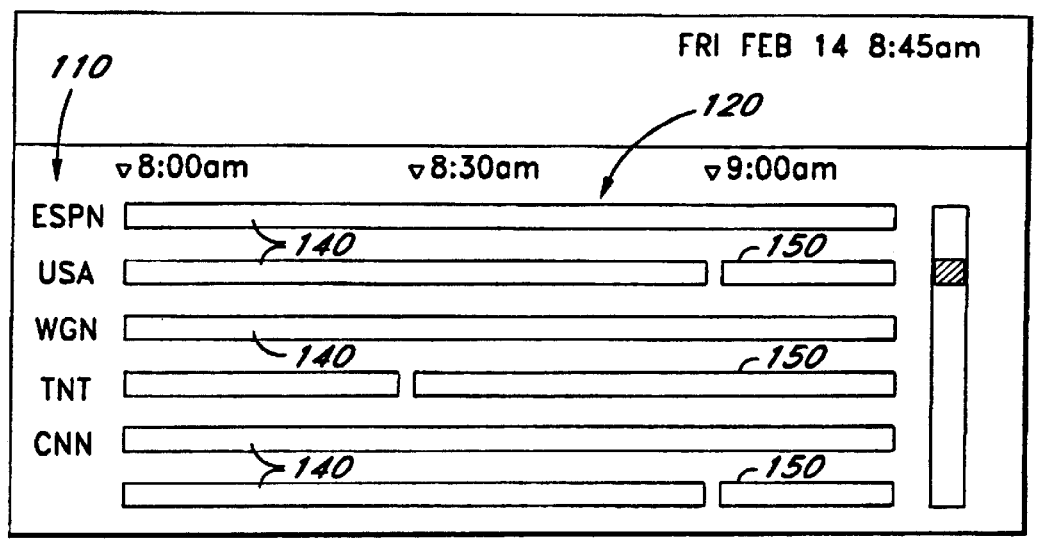
FIG. 1 illustrates a conventional electronic guide screen displayed on a television receiver illustrating shows that are currently being broadcast and shows that are scheduled to be broadcast in the future.
Figure 2:
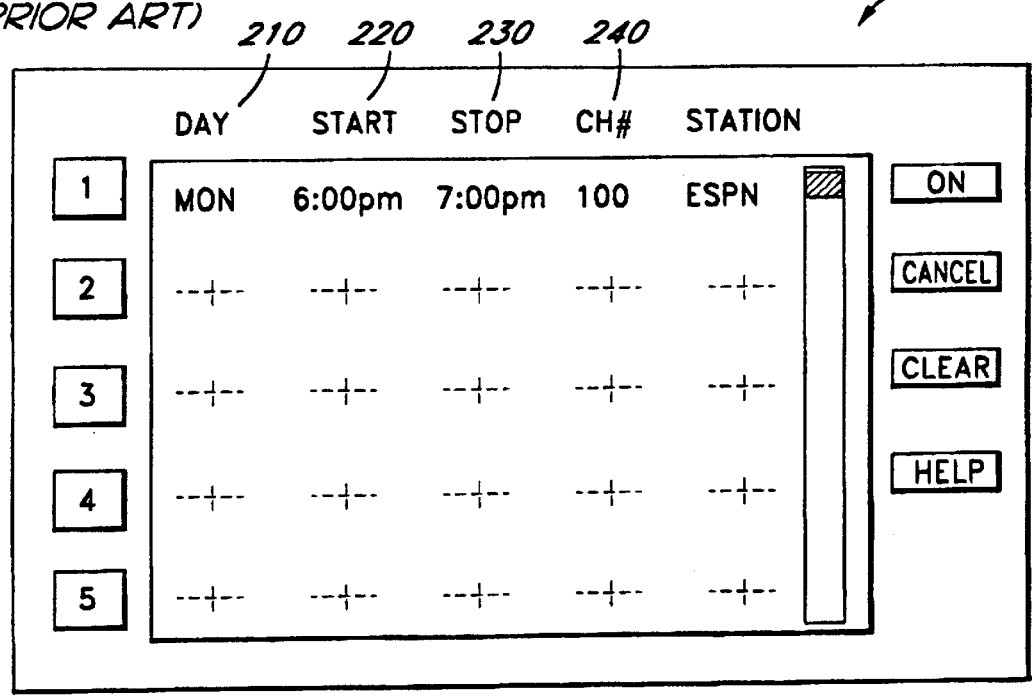
FIG. 2 illustrates a conventional set timer screen displayed on a television receiver.
Figure 3A:
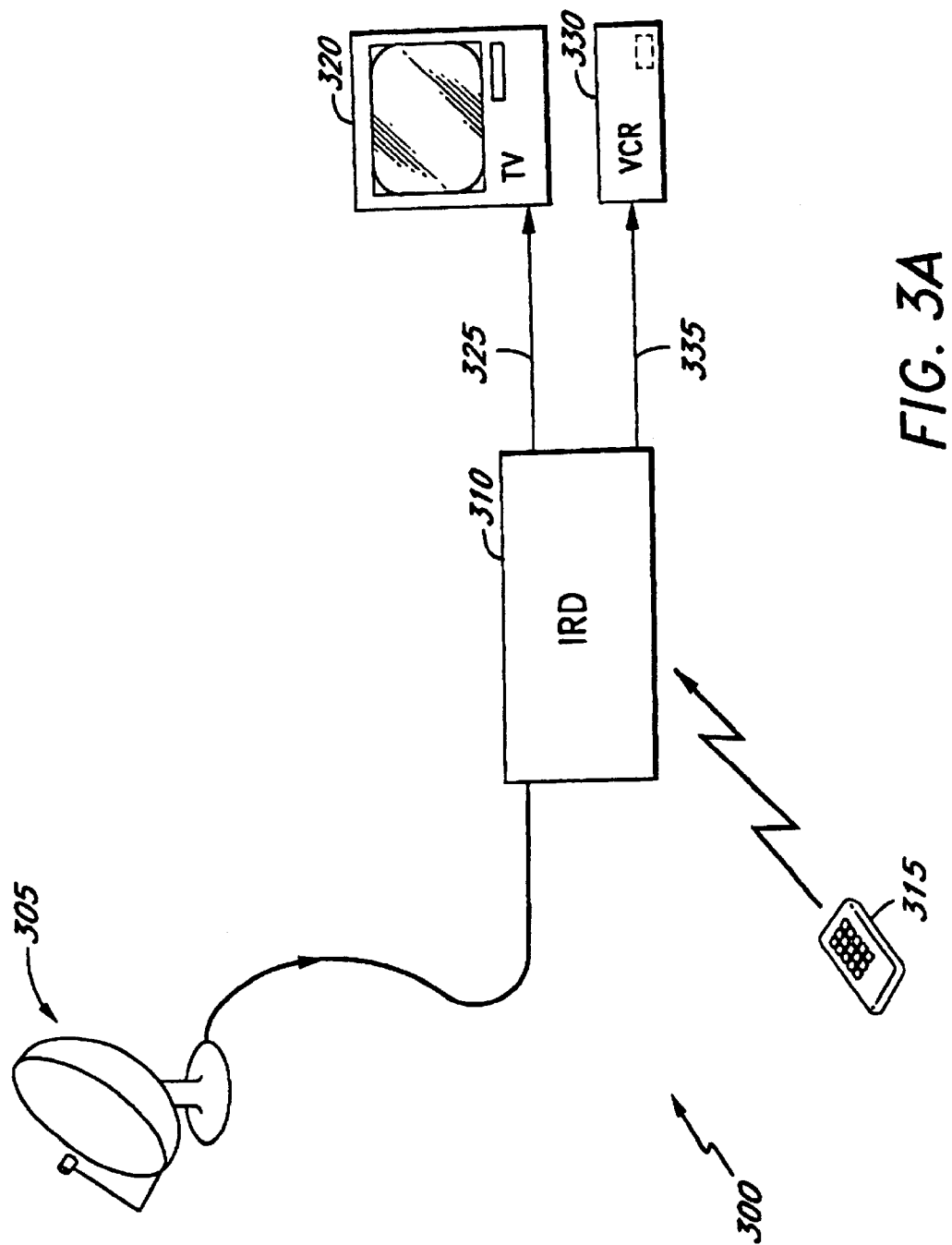
FIG. 3A is an illustrative embodiment of an entertainment system utilizing the present invention.

Referring to FIG. 3A, one embodiment of an entertainment system utilizing the present invention is shown. The entertainment system 300 comprises an antenna 305, a broadcast receiver 310 such as an integrated receiver decoder (IRD) for example, and at least one analog-input peripheral device (e.g., a display monitor such as television receiver "TV" 320 and/or an analog recording device 330 such as a video cassette recorder "VCR"). The broadcast receiver, in general, receives a broadcast signal (a digital bit stream for example) and performs operations on the broadcast signal to produce digital and/or analog information. Although the IRD is implemented as the broadcast receiver in this embodiment, other types of broadcast receivers may be used such as a cable box for a Cable Broadcasting System, an Internet terminal, a digital satellite system (DSS) computer and the like.

Antenna 305 receives the digital bit stream from an orbiting satellite (not shown) and routes the bit stream to IRD 310. The bit stream is formatted in accordance with any video compression function and is usually encrypted under either a symmetric key cryptographic function or a public-key cryptographic function. Typically, the bit stream includes sensory data (e.g., video and/or audio, or communication data) and control information for a number of shows. The control information for each show includes programming data having the following content: date of broadcast, broadcast channel number, show start-time, show end-time, and also show title.

IRD 310 is responsible for decoding the bit stream, for storing programming data in timer memory accessible by timer software executed by IRD 310, and for processing the decoded bit stream to produce one or more output signals having appropriate formats. As shown, an output signal is placed in an analog format and sent via communication line 325 to TV 320 for viewing, and/or via communication line 335 to analog recording device 330 for recording. The analog format may be in accordance with a video format established by National Television Systems Committee (NTSC), or perhaps other video formats, including but is not limited or restricted to Phase Alternating Line (PAL), Sequential Couleur Avec Memoire (SECAM) and other recognized formats.

The timer software is coded to support a data structure having a plurality of parameters. Upon executing timer software to perform a timer event for a show (e.g., recording, tune to a channel of a purchased show, etc.), each parameter is loaded with a portion of programming data associated with that show. For example, a first parameter of the data structure is loaded with the show title while other parameters are loaded with the date of broadcast, the broadcast channel number, the show start-time, and the show end-time. In addition, the data structure further includes a record parameter, loaded with a state value assigned to a selected option grid (see FIG. 6), to indicate to the timer software whether the show is to be recorded.

Figure 6:
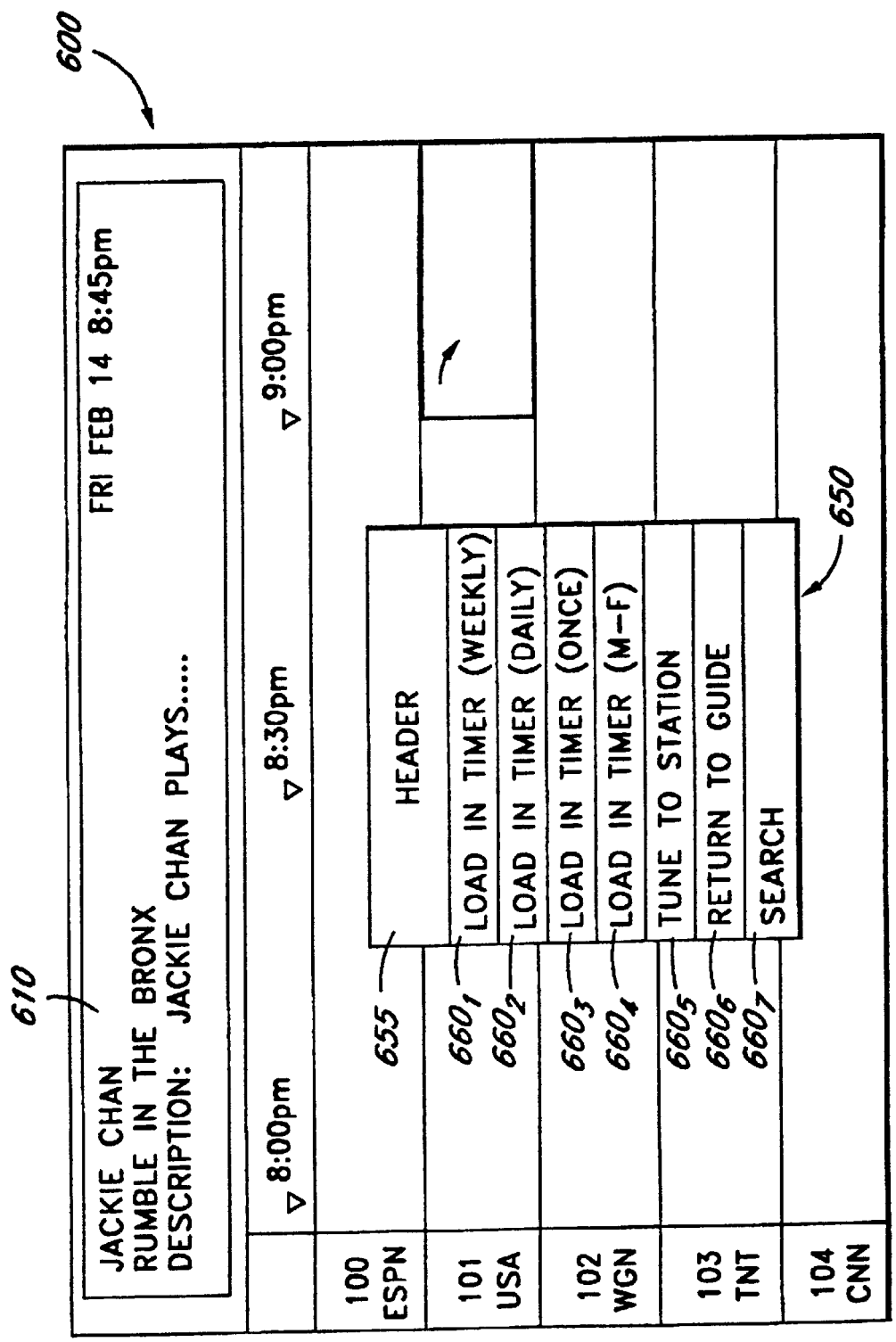
FIG. 6 is an embodiment of a screen menu, including a header and a plurality of option grids, superimposed over the electronic guide screen when selecting recordation of a future-broadcast show.

Additionally, IRD 310 is responsible for responding to a plurality of commands from a remote control 315. Remote control 315 may include any type of remote control, including one described in U.S. Pat. No. 5,453,758 assigned to Sony Corporation of Tokyo, Japan. Examples of commands from remote control 315 include a first command causing IRD 310 to produce an output signal displaying at least an electronic guide screen on TV 320. Likewise, a second command causes one of two conditions to occur. The condition depends on whether, upon initiating the second command, a cursor controlled by remote control 315 has already selected (e.g., highlight a portion of the electronic guide screen) either (i) a grid of a current-broadcast show, or (ii) a grid of a future-broadcast show. If the grid of a current-broadcast show has been selected, initiation of the second command would cause IRD 310 to tune to the broadcast channel of that show. If the grid of a future-broadcast show has been selected, initiation of the second command would cause IRD 310 to produce a screen menu for display with the electronic guide screen. The screen menu includes a number of option grids as shown in FIG. 6. Upon scrolling the screen menu to a selected option grid and initiating a third command from the remote control 315, programming data associated with the show would be either (i) loaded into timer memory and scheduled for recordation, or simply loaded into timer memory as discussed below.

FIG. 3B is an illustrative embodiment of the remote control 315 of FIG. 3A. The remote control 315 comprises a power key 350 for activating the IRD 310, a cable key 352 which facilitates selection of cable channels, a DSS key 354 which facilitates selection of satellite-based channels, a numerical keypad 360, a pair of volume keys 370a, 370b, a pair of channel selection keys 372a, 372b, and a an ABXY button grid 380 (which includes scroll buttons 382a-d). In one embodiment, the ABXY button grid 380 is a video game control used by many commercially available video systems such as those made and manufactured by Nintendo of Japan.

Figure 4:
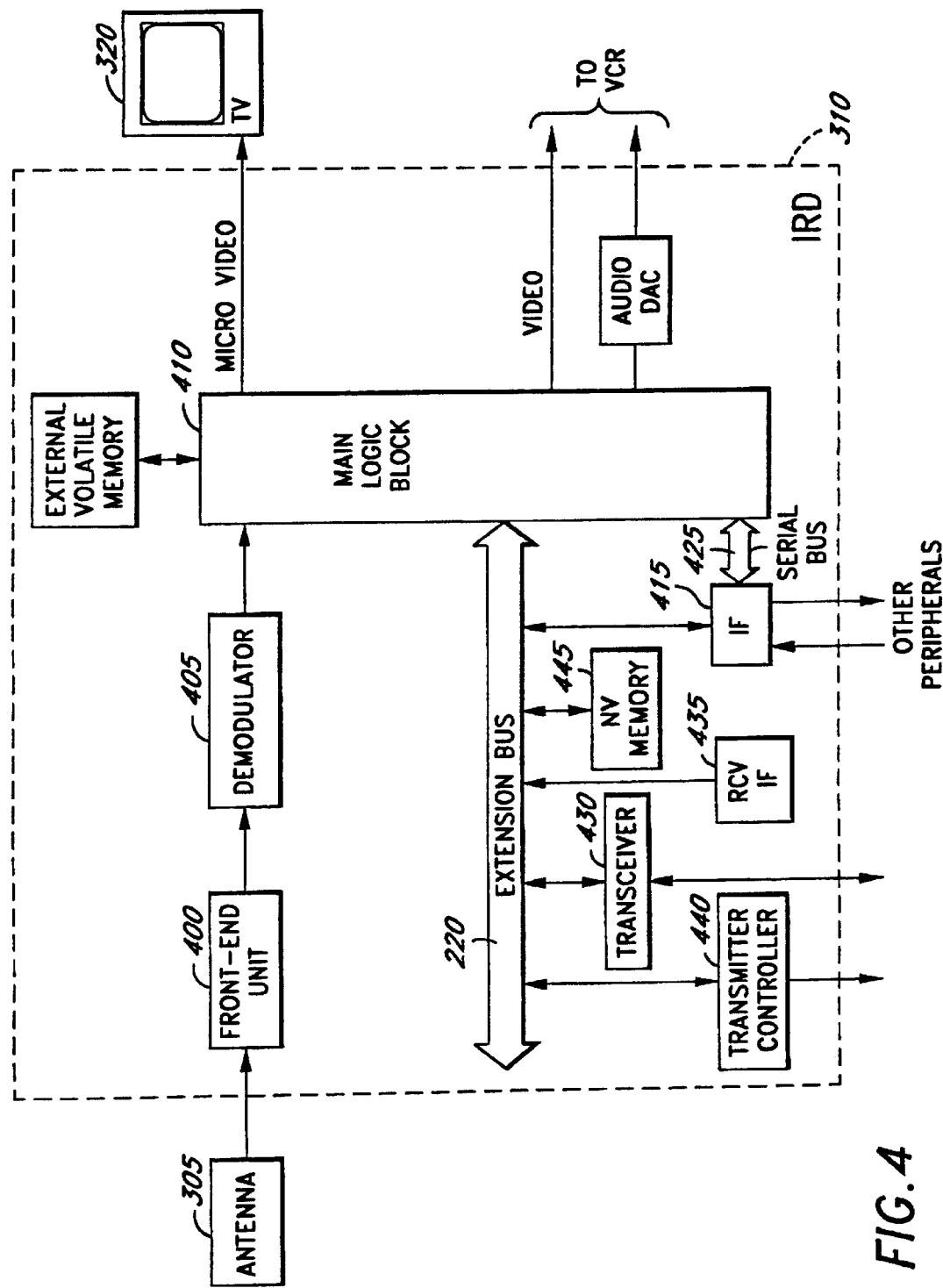
FIG. 4 is a detailed block diagram of one embodiment of an integrated receiver decoder implemented within the entertainment system of FIG. 3.

Referring now to FIG. 4, one embodiment of an integrated receiver decoder (IRD) 310 is shown. The antenna 305 transfers the bit stream to a front-end unit 400 of the IRD 310. Although not shown, the front-end unit 400 includes (i) amplification circuitry used to amplify any relatively weak signals received at antenna 305, and (ii) a tuner which allows a user to receive a desired broadcast channel.

For the case where the user wishes to view a show provided by the digital satellite system service provider, the bit stream associated with the desired broadcast channel is routed from front-end unit 400 to a demodulator 405. In demodulator 405, the bit stream is initially processed before transferring to a main logic block 410 for further processing. Such initial processing may include exposing the bit stream to QPSK-demodulation, viterbi-decoding, de-interleaving and Reed-Solomon decoding.

In certain situations, IRD 310 is connected to other peripheral devices though an interface (IF) 415. In this embodiment, IF 415 may include a link layer integrated circuit (IC) and a physical layer IC (not shown) and complies with the IEEE standards document 1394 entitled "Standard for High Performance Serial Bus" (hereinafter referred to as "IEEE 1394"). This enables IRD 310 to connect to digital-input peripheral devices such as digital VCRs, digital video disk players, digital laser disk players and the like. These digital-input peripheral devices communicate with a central processing unit (CPU) within main logic block 410 (see FIG. 5) through IF 415 and either extension bus 420 or alternatively an IEEE 1394 serial bus 425.

Referring still to FIG. 4, extension bus 420 supports input/output (I/O) communications by providing a communication path between electronic circuitry of the main logic block 410 and a number I/O related devices. These I/O related devices include a transceiver device 430 (e.g., a modem), a remote command unit interface (RCU-IF) 435, a transmitter controller 440 and an external non-volatile memory element 445 (e.g., read only memory "ROM", flash memory, etc.) acting as timer memory. RCU-IF 435 receives commands from the remote control (not shown), and decodes the commands to produce interrupt request signals (IRQs) corresponding to these commands. Each IRQ is transferred to the CPU within the main logic block 410.

Transmitter controller 440 provides a communication mechanism so that IRD 310 is able to communicate with an analog VCR via a remote transmitter 441 when one of the shows is scheduled to experience a timer event such as a timed recording. Otherwise, communications between the transmitter controller 440 and the remote transmitter 441 are disabled. Examples of the remote transmitter 441 may include, but are not limited or restricted to infrared transmitters such as those manufactured and commercially available from Matsushita of Osaka, Japan (referred to as a "VCR mouse"). External non-volatile (NV) memory element 445 is connected to extension bus 420 and contains programming data of shows scheduled to be recorded or to be viewed upon purchase, and software that controls the behavior of the user interface displays based on commands from the remote control as described above and in reference to FIGS. 5 and 6.

Figure 5:
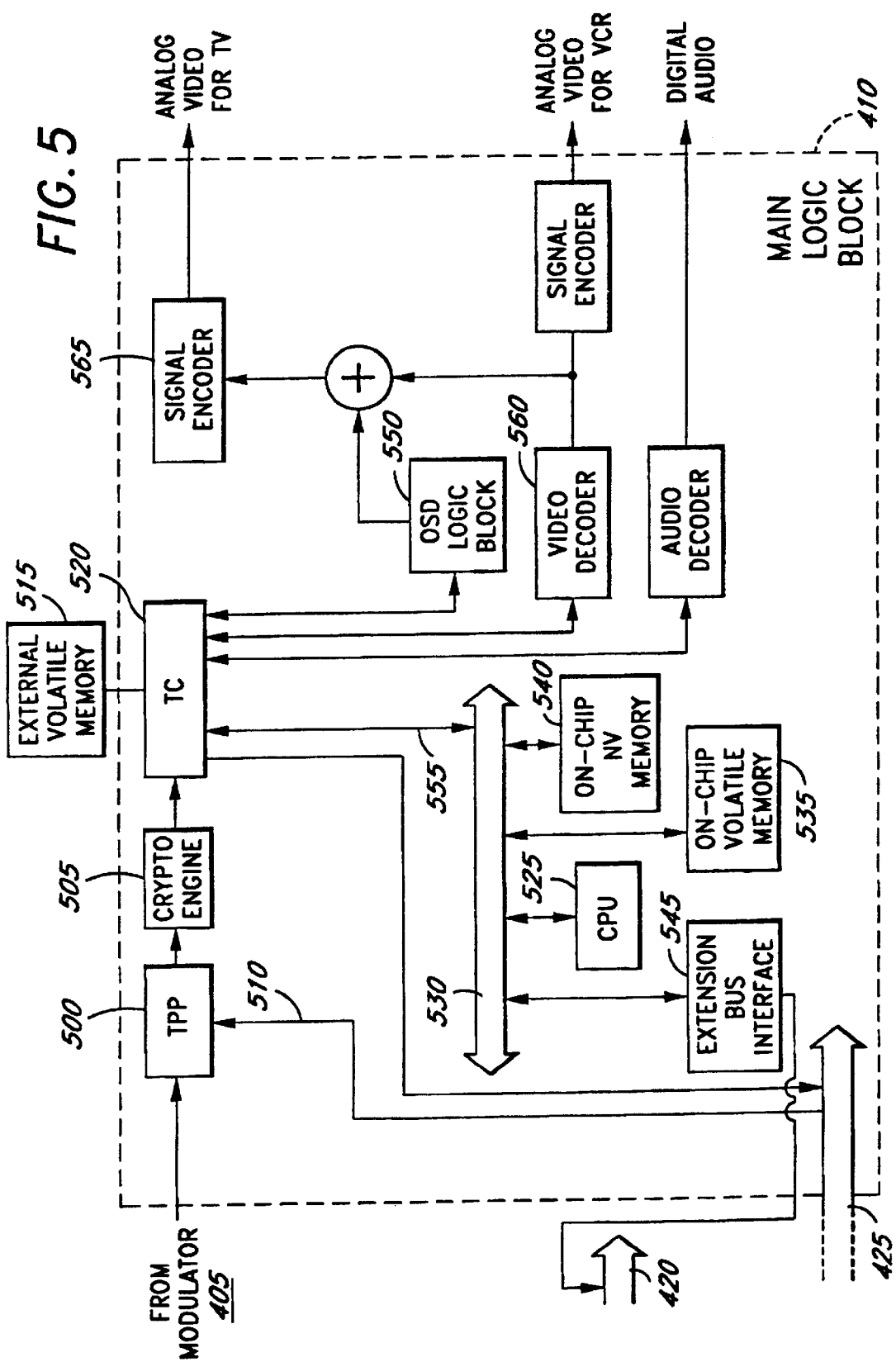
FIG. 5 is a detailed block diagram illustrating one embodiment of a main logic block of the integrated receiver decoder of FIG. 4.

Referring now to FIG. 5, electronic circuitry of the main logic block 410 is shown. The Transport Packet Parser (TPP) 500 receives the decoded bit stream and parses the bit stream. This parsed bit stream is decrypted by a cryptographic engine 505 which may operate in accordance with a cryptographic function, for example Data Encryption Standard (DES). However, if the bit stream is received from IF 415 via communication line 510, cryptographic engine 505 will be precluded from decrypting the bit stream since it is already in a decrypted form. Thereafter, the decrypted bit stream, including the programming data, is stored in an external volatile memory 515 (e.g., random access memory "RAM") under the control of traffic controller (TC) 520.

CPU 525 controls the operations of the IRD by communicating with a plurality of elements through an internal high-speed bus 530. These elements include an optional volatile memory 535, at least one non-volatile (NV) memory element 540 (e.g., read only memory "ROM", erasable programmable read only memory "EPROM", flash memory, etc.) to contain software programs, extension bus interface 545, and traffic controller 520. NV memory element 540, in lieu of external NV memory 445 of FIG. 4, may be used to store software needed by CPU 525 (e.g., interrupt software) or perhaps timer data. Extension bus interface 545 allows CPU 525 to communicate with the devices coupled to extension bus 420.

Referring to FIGS. 4—5, the operations performed by IRD 310 to support selective recording of programming data associated with a desired show are described. Upon receiving the first command from the remote control (e.g., user depressing "guide" button of remote control), RCU-IF 435 transfers a first interrupt request signal (IRQ1), corresponding to the first command, directly to CPU 525 or indirectly through a queuing mechanism (not shown). In response to detecting IRQ1, CPU 525 executes interrupt software contained in external NV memory element 445 (or NV memory element 540) and services IRQ1.

More specifically, in order to service IRQ1, CPU 525 executes interrupt software, normally coded to control an on-screen display (OSD) logic block 550, to produce the electronic guide screen. The first operation involves CPU 525 signaling traffic controller 520, via communication line 555, to retrieve at least programming data contained -in external volatile memory 515 and route the programming data to OSD logic block 550. Next, CPU 525 controls OSD logic block 550 to decompress the programming data in accordance with a recognized video format and to produce (for display) the electronic guide screen in a manner well-known in the art. In general, the programming data is processed as a bitmap to overlay appropriate grids forming the layout of the electronic guide screen 600 (see FIG. 6)

The electronic guide screen 600 may be superimposed over video by mixing the electronic guide screen with video output from video decoder 560. The video output is video received by main logic block 410 and decompressed in accordance with Moving Picture Experts Group (MPEG), Joint Picture Experts Group (JPEG) or any other video decompression function. Alternatively, the electronic guide screen 600 may be superimposed over a still background. In any event, the resulting mixed video output is transferred to signal encoder 565. Signal encoder 565 converts the mixed video output into an analog signal having a recognized video format such as NTSC, PAL, SECAM and the like.

In one embodiment, the electronic guide screen 600 includes a master program guide 610 (see FIG. 6) which lists the titles of programs available during a predetermined period of time (for example, each week), and which provides a description of the corresponding programs. Such a description may include the names of the actors, the time and channel of the broadcast. In one embodiment, the master program guide 610 is received by the antenna 305 at a predetermined period of time, for example, every week.

As the user selects a grid of the electronic guide screen 600 associated with a current-broadcast show, CPU 525 causes the front-end unit 400 to tune to receive and display video of that show as background. Upon RCU-IF 435 receiving the second command from the remote control (e.g., user depressing "select" button of the remote control) while the grid of the current-broadcast show is selected, RCU-IF 435 transfers a second interrupt request signal (IRQ2). In response to detecting IRQ2, CPU 525 executes interrupt software and services IRQ2 by signaling the front-end unit 400 to tune to the broadcast channel of the current-broadcast show and to discontinue producing the electronic guide screen.

In the event that a future-broadcast show is selected, a still background is provided. Upon receiving the second command from the remote while the grid of the future-broadcast show is selected, RCU-IF 435 transfers a third interrupt request signal (IRQ3). In response to detecting IRQ3, CPU 525 executes interrupt software and services IRQ3 by signaling OSD logic block 550 to further superimpose a screen menu 650 over the electronic guide screen 600 as shown in FIG. 6.

Referring now to FIG. 6, the screen menu 650 includes a header 655 and a plurality of option grids $660_{1-7}$. For example, as shown, the header 655 indicates that the user has selected a future-broadcast show. A first option grid $660_1$, if selected, loads programming data of the desired show into external NV memory 445 (of FIG. 4), along with a first state value (e.g., logic "00"). When CPU 525 is executing timer software, the first state value is loaded into the record parameter to indicate that the show is to be recorded weekly. Likewise, a second option grid $660_2$, if selected, alternatively loads programming data associated with the desired show into external NV memory 445 (of FIG. 4), along with a second state value (e.g., logic "01"). When CPU 525 is executing timer software, the second state value is loaded into the record parameter to indicate that the show is scheduled to be recorded daily. A third option grid $660_3$, if selected, alternatively loads programming data associated with the desired show into external NV memory 445 (of FIG. 4), along with a third state value (e.g., logic "10"). When CPU 525 is executing timer software, the third state value is loaded into the record parameter to indicate that the show is scheduled to be recorded once, at the specified time.

Also as shown in FIG. 6, the fourth option grid $660_4$, if selected, causes the IRD to load programming data associated with the desired show into external NV memory 445 (of FIG. 4), along with a fourth state value (e.g., logic "11"). When CPU 525 is executing timer software, the fourth state value is loaded into the record parameter to indicate that the show is scheduled to be recorded from Monday through Friday (M-F).

As further shown in FIG. 6, the fifth option grid $660_5$, if selected, causes the IRD to tune to the channel which will be broadcasting this show. The sixth option grid $660_6$, allows the user to exit the screen menu 650 and to return to the electronic guide screen. The interrupt software used to produced the screen menu 650 also restricts cursor movement in scrolling of the option grids $660_1$—$660_7$. Also as shown in FIG. 6, the seventh option grid $660_7$, if selected, allows the user to exit the screen menu 650 and to proceed to a timer search screen menu 700 as shown in FIG. 7, and as discussed below.

Figure 7:
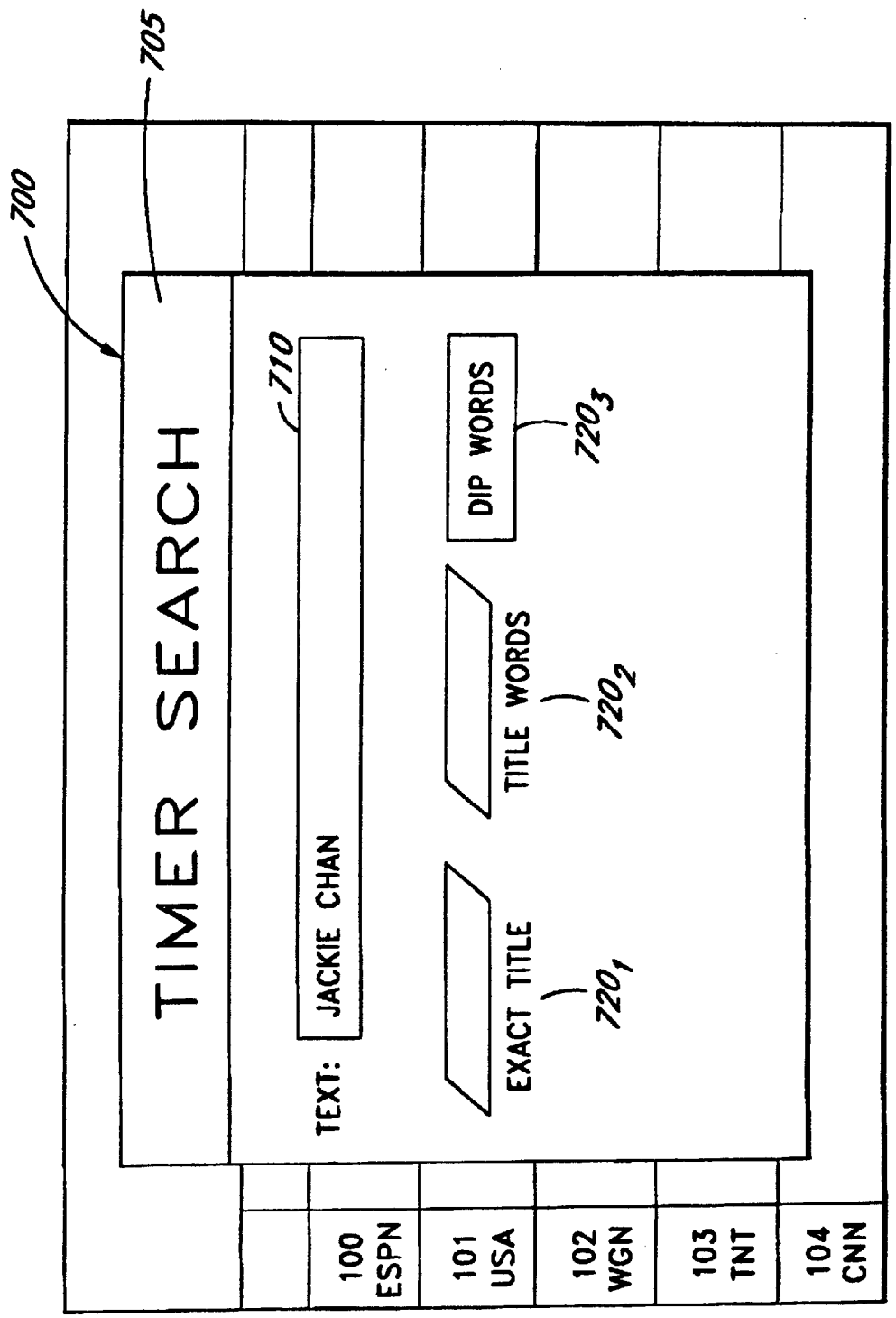
FIG. 7 is an embodiment of a screen menu, including a header and a plurality of option grids, superimposed over the electronic guide screen when a selecting or deselecting recordation of a future-broadcast show that has already been selected for recording.

Referring to FIG. 7, in the event that the user desires programming of a future-broadcast show for the next predetermined number of scheduled broadcasts, irrespective of the programming interval, the fifth option grid $660_7$, may be selected. Upon selection of the seventh option grid $660_7$, the IRD generates a menu 700 over the electronic guide screen. The menu 700 includes a header 705 which indicates that the timer search is available. The menu 700 further includes a search field 710, a first option grid $720_1$, a second option grid $720_2$ and a third option grid $720_3$. The search field 710 facilitates entry of one or a string of words to search for a show or shows for which programming is desired. The first option grid $720_1$, if selected, indicates that searching would be performed using the exact title of a program, for example, "The Lucy Show". The second option grid $720_2$, if selected, indicates that searching would be performed using selected words from the exact title of a program, for example, "McNeil . . . Hour" instead of the entire exact title "The McNeil Lehrer News Hour". The third option grid $720_3$, if selected, indicates that searching would be performed using selected words from the master program description 610 (see FIG. 6) of the show.

In one embodiment, the words or terms used for conducting the search may be entered by using the scroll buttons 382a—d on the ABXY button grid 380 of the remote control 315. For example, the central processing unit 525 (FIG. 5) may be configured to execute software (stored in either NV memory 445 or NV memory 540) so as to scroll through letters of the alphabet in an ascending order, i.e., from A through Z, by depressing the up scroll button 382a. Selection of the desired letter may be entered by depressing the button 384. Similarly, the central processing unit 525 may be configured to execute software so as to scroll through the letters of the alphabet in a reverse order, i.e., from Z through A, by depressing the down scroll button 382c. Upon selection of a letter, the right and left scroll buttons 382b and 382d may be used to move the cursor to the right or left of the selected letter respectively. When the search words or terms have been entered, the selection button 384 is depressed.

Upon receiving the search terms, the CPU 525 executes software to search the master program guide 610 for the entered search terms. In one embodiment, the master program guide 610 includes all the programs that will be broadcast in all channels for a predetermined time period, for example, one week. Upon finding a match, programming data associated with the show having the search term will be loaded into the timer memory. In one embodiment, programming data associated with the show, such as the complete title of the show, will first be displayed for user confirmation, before the programming data associated with the show having the search term is loaded into the timer memory. In another embodiment, programming data associated with the show is directly loaded into the timer memory. In one embodiment, software executed by the CPU 525 will load up to a predetermined number of programming data associated with the show having the search terms. For example, up to 10 shows (or any specified number) having the search term "Lucy" will be programmed to be recorded. As a result, every program listed in the master program guide 610 having the listed search term, for example, "Lucy", may be automatically programmed to be recorded. Such recording may be provided over a predetermined period of time, for example, over the span of a week. However, it is contemplated that such recording using a listed search term(s) may be provided over any predetermined period of time.

It is contemplated that other operations, besides recording, may be configured to be selected or deselected during viewing of the electronic guide screen or another screen. For example, the purchase of a show (e.g., a pay-per-view show) may be selected or deselected. For example, upon RCU-IF 435 receiving the third command from the remote while a grid associated with a pay-per-view show is highlighted, RCU-IF 435 transfers a sixth interrupt request signal (IRQ6). In response to detecting IRQ6, CPU 525 executes interrupt software, also contained in external NV memory element 445, to service IRQ6 by generating one or more subsequent display screens (not shown) overlaid over the electronic guide screen or substituted for the electronic guide screen. These screens require user interaction to confirm the purchase of a future-broadcast show and to request whether the programming data associated with purchased show is to be loaded into timer memory. Thereafter, the interrupt software causes the grid associated with the purchased show, to include a third icon 830 to represent that the show has been purchased as shown.

Through the implementation of the present invention, one or more shows may be selected for recording by merely listing one or more search terms associated with the show. As a result, selection of a show to be recorded may be performed without substantial user interaction. In addition, the frequency of recording errors may also be reduced.

The present invention described herein may be designed in many different embodiments and using many different configurations. As discussed herein, the architecture of the IRD is flexible. While the present invention has been described in terms of various embodiments, other embodiments may come to mind to those skilled in the art without departing from the spirit and scope of the present invention. The invention should, therefore, be measured in terms of the claims which follow.

What is claimed is:

1. A method for selectively recording a show capable of being received and displayed by an entertainment system, the method comprising:

receiving programming data associated with the show;

specifying at least one search term associated with the show to search for at least one show associated with that search term, the search term including a number of words associated with at least one of a title, a description, a time, and a channel of the show; and automatically recording any shows associated with the search term.

2. The method of claim 1, wherein specifying at least one search term includes specifying a title of the show.

3. The method of claim 1, wherein specifying at least one search term includes specifying at least a search term associated with a title of the show.

4. The method of claim 1, wherein specifying at least one search term includes selecting at least a search term associated with the show from a master program description.

5. The method of claim 1, wherein receiving programming data includes receiving a digital bit stream including the programming data and sensory data corresponding to the programming data.

6. The method of claim 1, wherein specifying at least one search term includes executing software by a central processing unit, implemented within the entertainment system, to produce a screen menu; and selecting an option grid of the screen menu to prompt specification of the search term associated with the show.

7. The method of claim 6, wherein specifying at least one search term includes executing software by the central processing unit to produce a search screen menu; and entering the search term associated with the show.

8. The method of claim 1, wherein automatically recording any shows associated with the search term includes loading the programming data into the timer memory to indicate that a predetermined number of instances of the show having the specified search term associated with the show is scheduled to be recorded.

9. The method of claim 8, wherein automatically recording any shows associated with the search term includes recording the predetermined number of instances of the show over a predetermined period of time.

10. The method of claim 6, wherein specifying at least one search term further includes alternatively selecting a second option grid of the screen menu to cause a broadcast receiver to tune to a broadcast channel of the show; and alternatively selecting a third option grid to exit the screen menu.

11. An entertainment system comprising:

a broadcast receiver including a front-end unit capable of receiving programming data associated with a show broadcast for viewing and including at least one search term associated with the show, the search term including a number of words associated with at least one of a title, a description, a time, and a channel of the show, the broadcast receiver executing software to search for at least one show associated with that search term and loading programming data associated with the show in accordance with the search term received so that the show associated with that search term is automatically recorded.

12. The entertainment system of claim 11, wherein the search term includes the title of the show.

13. The entertainment system of claim 11, wherein the search term is selected from a master program description.

14. The entertainment system of claim 11 further comprising a display monitor.

15. The entertainment system of claim 11, wherein the broadcast receiver includes an integrated receiver decoder.

16. The entertainment system of claim 11, wherein the broadcast receiver executes software to provide a screen menu, and wherein selection of an option grid of the screen menu signals the broadcast receiver to execute software to provide a search screen menu which prompts specification of the search term associated with the show.

17. The entertainment system of claim 16, wherein the broadcast receiver is configured to record a predetermined number of instances of the show having the specified search term.

18. The entertainment system of claim 17, wherein the broadcast receiver is configured to record the predetermined number of instances of the show over a predetermined period of time.

19. The entertainment system of claim 16, wherein the screen menu further comprises a second option grid which is selectable to cause the broadcast receiver to tune to a broadcast channel of the show.

20. The entertainment system of claim 16, wherein the screen menu further comprises a second option grid which is selectable to exit the screen menu.

* * * * *